Aug. 29, 1950         H. H. WESIK         2,520,790
ADJUSTABLE CLAM OPENER
Filed Nov. 20, 1947                       2 Sheets-Sheet 1
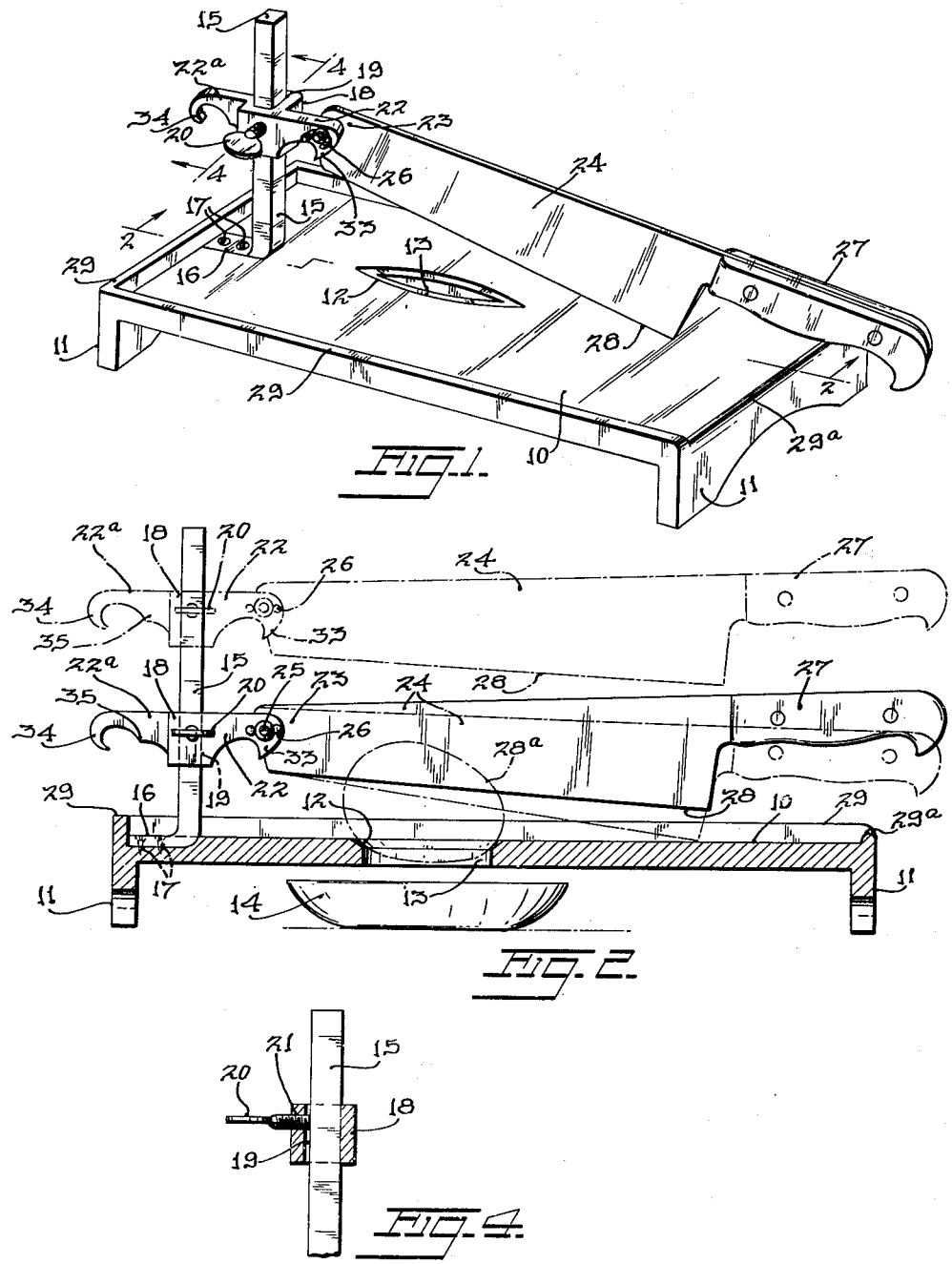
INVENTOR.
HARRY H. WESIK
BY
ATTORNEY

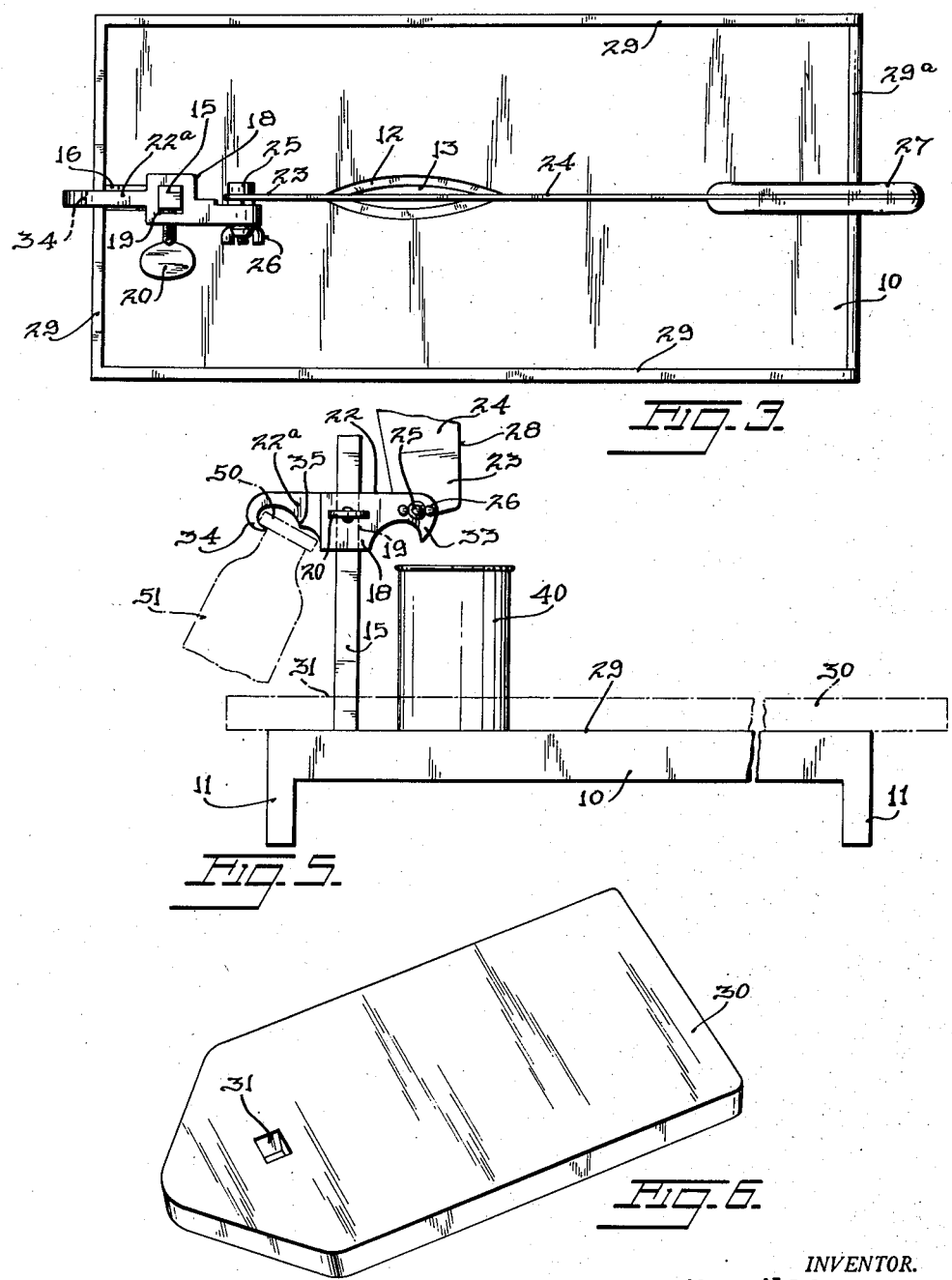

Patented Aug. 29, 1950

2,520,790

UNITED STATES PATENT OFFICE 2,520,790

ADJUSTABLE CLAM OPENER

Harry H. Wesik, Lindenhurst, N. Y.

Application November 20, 1947, Serial No. 787,202

1 Claim. (Cl. 17—9)

This invention relates to an improved device for opening clams and similar shell fish and for cutting vegetables, and one of its objects is to provide means which can be adjusted to different sizes of clams or other shell fish, for separating the shell sections from each other by a knife splitting action.

Another object of the invention is to provide a table on which clams and similar shell fish may be rapidly opened by a pivoted knife splitting action, and the elevation of the knife pivot adjusted so that any size of clam or other shell fish may be positioned under the knife and it may be operated in the usual manner to split the sections of the clams or other shell fish apart.

A further object of the invention is to provide means for draining the juice from the opened clam or other shell fish into a receptacle.

A further object of the invention is to combine a bottle opener and a can puncturing arrangement with the device.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of the improved table and clam opening means.

Fig. 2 is a vertical longitudinal sectional view, taken on line 2—2 of Fig. 1, looking in the direction of the arrows, showing the drain plates and the juice receptacle.

Fig. 3 is a top plan view thereof.

Fig. 4 is a detail vertical sectional view taken on line 4—4 of Fig. 1, looking in the direction of the arrows, on an enlarged scale.

Fig. 5 is a side elevation of the combined clam or shell opening device and a can piercing and bottle cap removing tool.

Fig. 6 is a perspective view of vegetable chopping board which may be used with the device.

Referring to the drawings, which show the practical construction of a clam opening table, embodying my invention, 10 designates a work table, supported by legs 11, and provided with a clam shell holding socket or pit 12 formed in the upper surface, and provided with a drain opening 13 at the center of this holding socket.

A dish or a receptacle 14 may be placed under the table to cause juice from opened clams to collect in said receptacle under the outlet or drain opening 13.

On the table 10 an upright metal post 15 is secured by means of its base 16 and the screws 17. This post is rectangular in cross section, and has smooth sides, and supports the bracket 18, which is slidable on the post from the upper end to the lower end thereof, and which is formed with a hole or bearing 19 to receive the post 15, which corresponds to the shape of the post, and thereby prevents the bracket from turning on the post. This bracket is adjusted by means of the screw 20, which is threaded into the bracket at one side 21 thereof.

On one side of the bracket 18 a bearing lug 22 is formed, and on this bearing lug the forward end 23 of the cutting or splitting knife 24 is pivotally supported, as by a bolt 25 and nut 26. The knife or splitter 24 is provided with a handle 27, so that manual pressure may be applied to the cutting edge 28 of the knife.

In using the improved table and clam opening equipment, a clam 28ª is placed in the holding or locating socket or pit 12, with its edges disposed in a vertical plane, and the bracket 18 is adjusted on the post 15, by means of the clamping screw 20 to the preferred height. The cutting edge 28 of the knife or splitter is then forced against the upper edge portion of the clam and manual pressure is brought against the handle of the knife to force the cutting edge through the edge of the shell and thus force apart the sections of the clam shell. The table 10 is provided with raised edges 29 at three sides of the table top, but the fourth edge 29ª under the handle 27 is somewhat lowered to prevent one's fingers from being injured.

In opening clams in large quantities they are first graded into corresponding sizes, and the clams of each graded size are first opened, and then the other graded sizes are opened. My invention provides an adjustable pivot bracket which can be raised and lowered, so that in each and every case the operator uses the same type of pressure and the same downward stroke on the splitter or knife.

The table and the splitting tool may be used for all types and sizes of clams, oysters and other shell fish; and may also be used for slicing vegetables and fruit, or for splitting coconuts, and small shell nuts, or for chopping meat or the like.

In Figs. 5 and 6 a chopping board 30 is shown. This chopping board is shown with a rectangular opening 31 adapted to engage over the vertical post 15. This board may be lowered to rest on the raised edges 29 of the table 10 and then the bracket 18 with the cutting knife 24 is also lowered to any desired location and secured in position by the screw 20, as previously set forth for slicing or chopping vegetables or other food products. The board 30 is prevented from sliding in any direction by the rectangular opening 31 which engages the post 15. After use, the board 30 may be readily removed by first removing the bracket 18. Then the board may be cleaned in the usual manner.

The lug 22 of the bracket 18 is equipped with a can piercing or puncturing sharp point 33, adapted to pierce the upper end of a milk or other food can. The bracket 18 is also provided with another lug 22a which is equipped with a bottle cap removing hook tool located on the opposite side thereof.

When it is desired to use the slide to pierce a can 40, the can is positioned directly under the sharp point 33 and the screw 20 is turned to open position. Then the sharp point 33 is forced into the can top, thus producing a pouring hole. Another similar hole may be punctured opposite the first hole and the other to discharge the fluid contents of the can 40.

When it is desired to remove a bottle cap 50 the neck of the bottle 51 is placed against the hook tool 34 so that the terminal of the hook tool will engage the edge of the bottle cap, while the abutment 35 will be engaged by the center of the bottle cap, by forcing the bottle downwardly the cap will be disengaged from the bottle.

My invention thus provides means for opening clams, oysters and other shell fish, and for cutting vegetables, also for opening bottles and cans containing fluids which can be discharged through small pouring holes.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A device of the class described for opening shell fish and having a table top provided with a shell locating pit and a knife, means for adjustably pivotally supporting the knife in position over the shell locating pit, comprising a post of non-circular cross-section extended upwardly from the table top rearward of the shell locating pit, a bracket non-rotatively but vertically slidably mounted on said post, a lug projecting forward from said bracket, a removable nut and bolt assembly pivotally attaching one end of the knife to said lug, and a screw threaded through said bracket and abutted against one side of said post for securing said bracket in a desired vertical adjusted position on said post in accordance with the size of the shell fish to be opened with the knife.

HARRY H. WESIK.

REFERENCES CITED

The following references are of record in the file of this patent:

UNITED STATES PATENTS

| Number | Name | Date |
| --- | --- | --- |
| 210,032 | Heimlich | Nov. 19, 1878 |
| 845,521 | Carlson | Feb. 26, 1907 |
| 1,007,593 | Moore | Oct. 31, 1911 |
| 1,182,781 | Mendenhall | May 9, 1916 |
| 1,536,053 | Baker | May 5, 1925 |
| 1,830,284 | Massa | Nov. 3, 1931 |
| 2,000,075 | Hallock | May 7, 1935 |
| 2,136,816 | Frazier | Nov. 15, 1938 |